United States Patent
Onaizi

(10) Patent No.: US 12,415,726 B2
(45) Date of Patent: Sep. 16, 2025

(54) PROCESS FOR SIMULTANEOUS REMOVAL OF HYDROGEN SULFIDE AND HEAVY METALS

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 520 days.

(21) Appl. No.: 17/961,318

(22) Filed: Oct. 6, 2022

(65) Prior Publication Data

US 2024/0124305 A1 Apr. 18, 2024

(51) Int. Cl.
| | |
|---|---|
| C01B 17/16 | (2006.01) |
| B01D 53/48 | (2006.01) |
| B01D 53/52 | (2006.01) |
| B01D 53/86 | (2006.01) |
| B01D 53/96 | (2006.01) |

(Continued)

(52) U.S. Cl.
CPC .......... *C01B 17/168* (2013.01); *B01D 53/485* (2013.01); *B01D 53/523* (2013.01); *B01D 53/8606* (2013.01); *C01B 17/162* (2013.01); *B01D 2257/308* (2013.01); *C01P 2006/80* (2013.01)

(58) Field of Classification Search
None
See application file for complete search history.

(56) References Cited

U.S. PATENT DOCUMENTS

| 5,976,372 A | 11/1999 | Vesterager |
| 11,230,771 B2 | 1/2022 | Tarabukin |

(Continued)

FOREIGN PATENT DOCUMENTS

| CN | 110482795 A | 11/2019 |
| EP | 0 880 475 B1 | 2/1997 |
| UA | 103087 C2 | 9/2013 |

*Primary Examiner* — Daniel Berns
(74) *Attorney, Agent, or Firm* — Oblon, McClelland, Maier & Neustadt, L.L.P.

(57) ABSTRACT

A process for simultaneous removal of hydrogen sulfide ($H_2S$) and heavy metals from mixture includes charging a contaminated aqueous composition containing heavy metal ions to a reactor. The process also includes passing a $H_2S$-containing gas composition via a plurality of gas spargers through the contaminated aqueous composition present in the reactor to form a $H_2S$-containing contaminated aqueous composition and a purified gas composition. The process further includes reacting the $H_2S$ from the $H_2S$-containing contaminated aqueous composition with the heavy metal ions in the $H_2S$-containing contaminated aqueous composition to form a metal sulfide precipitate in a metal-sulfide-containing contaminated aqueous composition. In addition, the process includes at least partially introducing the metal-sulfide-containing contaminated aqueous composition to a solid-liquid separator and removing the metal sulfide precipitate from the metal-sulfide-containing contaminated aqueous composition to form a purified aqueous composition.

19 Claims, 6 Drawing Sheets

(51) Int. Cl.
*C02F 1/46* (2023.01)
*C02F 1/52* (2023.01)
*C10L 3/10* (2006.01)

(56) References Cited

U.S. PATENT DOCUMENTS

2007/0196255 A1* 8/2007 Sherman .............. C01B 17/60
423/220
2010/0098618 A1  4/2010 Keller et al.

* cited by examiner

PROCESS FOR SIMULTANEOUS REMOVAL OF HYDROGEN SULFIDE AND HEAVY METALS

BACKGROUND

Technical Field

The present disclosure is directed to a process for simultaneous removal of hydrogen sulfide ($H_2S$) and heavy metals from mixture, and particularly, to the process for simultaneous removal of $H_2S$ from a $H_2S$-containing gas composition, and heavy metals from a contaminated aqueous composition.

Description of Related Art

The "background" description provided herein is to generally present the context of the disclosure. Work of the presently named inventors, to the extent it is described in this background section, as well as aspects of the description that may not otherwise qualify as prior art at the time of filing, are neither expressly nor impliedly admitted as prior art against the present invention.

Of the numerous heavy metals, mercury, lead, cadmium, and chromium are widely used in medical, agricultural, industrial, and technological applications. However, the release of those heavy metals into the environment may oftentimes cause health and environmental problems, such as cancer, renal kidney disease, nervous system damage, and nervous disorders. Additionally, the release of heavy metals is attributed mainly to the discharge of waste water containing dissolved metal species and the dump of heavy metal-containing solid wastes into the landfill. Moreover, due to their high degree of toxicity, heavy metals can cause severe effects on the body even at the trace level. The none-biodegradable nature of heavy metals and their ions, for example mercury ions (Hg(II)), also allows them to remain in the environment for a very long time, and eventually lead to the accumulation of large quantities of Hg(II) in the human body via the consumption of food and water contaminated by the mercury ions released.

Hydrogen sulfide is a colorless, odiferous and highly toxic gas that can cause possible life-threatening situations at a concentration as low as 350 ppm for a short-term exposure. In addition to its toxicity, health and safety issues, this colorless gas is also highly corrosive and hence it is desirable and often necessary to remove hydrogen sulfide from a hydrogen sulfide containing stream, such as sour natural gas, biogas, and sour gases.

Accordingly, the maximum concentration of $H_2S$ in marketable natural gas is 4 ppmv at standard temperature and pressure [Mandald, B.; Bandyopadhyay, S. S., Simultaneous absorption of $CO_2$ and $H_2S$ into aqueous blends of N-methyldiethanolamine and diethanolamine, Environ Sci Technol., 2006, 40(19):6076-84], which is considered to be the threshold value above which the natural gas needs to be sweetened in order to reduce the $H_2S$ concentration. Localized corrosion and stress cracking is common in pipes/units handling $H_2S$-containing streams. It has been reported that the presence of $H_2S$ even at low concentrations can cause a substantial adverse impact on carbon steel [Rebak, R. B.; Perez T. E., Effect of Carbon Dioxide and Hydrogen Sulfide on the Localized Corrosion of Carbon Steels and Corrosion Resistant Alloys., 2017, NACE International Conference: New Orleans, Louisiana, USA]. Therefore, $H_2S$ must be effectively scavenged from sour gases to not only mitigate its safety and operational issues but also reduce its damage to the pipelines, valves and surfaces of process equipment.

Technologies and approaches to these problems have been developed industrially for sweetening (e.g., removing $H_2S$) hydrocarbons and natural gas. These technologies and approaches mainly involve the use of amine-based solutions, carbonaceous materials, or metal salts as adsorbents for the adsorption of $H_2S$, or as oxidizers for converting $H_2S$ to more harmless element sulfur. However, these technologies and approaches suffer from high production costs, corrosivity problems associated with the amine-based solutions, lack of selectivity, and by-product generation, etc. Thus, efforts have been taken to develop tools and methods of scavenging $H_2S$ from natural gas and other sour gases.

U.S. Pat. No. 9,587,181 to Lehrer et al. (Lehrer) discloses the use of water-soluble aldehydes and transition metal salts for $H_2S$ scavenging present in aqueous fluids. Garrett et al. [Garrett, R. L.; Clark, R. K.; Carney, L. L.; Grantham, C. K., Chemical scavengers for sulfides in water-base drilling fluids, Journal of Petroleum Technology., 1979, 31(6): 787-796, incorporated herein by reference in its entirety] uses zinc compounds (e.g., zinc carbonate and zinc oxide) as $H_2S$ scavengers. U.S. Pat. No. 9,480,946 to Ramachandran et al. (Ramachandran) discloses the use of metal carboxylate salts as $H_2S$ scavengers in both dry and wet hydrocarbon gas systems. Divalent iron salts have shown capability to absorb $H_2S$ from drilling mud as described in U.S. Pat. No. 6,365,053. Copper carbonate is also able to remove $H_2S$ from gaseous streams as disclosed by Dyke and Wagner in U.S. Pat. No. 3,506,572. U.S. Pat. No. 6,960,330 to Cox (Cox) describes a method for reducing $H_2S$ contamination by adding Fe-MGDA and a peroxide (e.g., hydrogen peroxide) to a $H_2S$-containing medium. Browning et al. (described in U.S. Pat. No. 3,928,211) reveals that zinc and copper compounds (e.g., $Zn(OH)_2$, $CuCO_3$, and $ZnCO_3$) can reduce the concentration of $H_2S$ (in the form of soluble sulfides) from more than 1,100 ppm to about 50 ppm.

U.S. Pat. No. 5,700,438 to Miller (Miller) discloses a process for $H_2S$ and mercaptans removal from gas streams by contacting a $H_2S$-containing gas stream with an aqueous solution of copper complex of a water-soluble amine. The reaction of the copper complex of the water-soluble amine with $H_2S$ generates water-insoluble copper sulfide and releases the water-soluble amine. U.S. Pat. No. 4,153,547 A to McLean (McLean) discloses a method for the desulfurization of well water using acidified copper sulfate. WO Pat. No. 2015116864 A1 to Martin (Martin) describes the use of a family of metals chelates for hydrogen sulfide scavenging from asphalt. EP Pat. 0,257,124 A1 to McManus and Kin (McManus and Kin) discloses the use of an aqueous chelated polyvalent metal catalyst solution for $H_2S$ scavenging. U.S. Pat. No. 4,478,800 A to Willem et al. (Willem) relates to a method for the removal of sulfur compounds from gaseous streams. The method involves passing a $H_2S$-containing gaseous stream over an inert support containing metal oxides. The supported metal oxides can react with $H_2S$ and generate metal-sulfur compounds.

Oakes discloses in U.S. Pat. No. 4,473,115 a method for reducing the concentration of $H_2S$ present in subterranean well fluids through the injection of a stabilized solution of chlorine dioxide. The mixing of the said solution with a drilling mud can further reduce the $H_2S$ content in a $H_2S$-contaminated drilling mud. U.S. Pat. No. 4,805,708 to Matza et al. (Matza) discloses a method for controlling the content of zinc-based $H_2S$ scavenger added to oil-based drilling fluids. U.S. 9,587,181 B2 to Lehrer et al. (Lehrer) discloses the use of $H_2S$ scavengers based on transition metal salts (e.g., zinc carboxylate or iron carboxylate) and at least one water-soluble aldehyde/aldehyde precursor (e.g., ethylene glycol hemiformal) for $H_2S$ removal from natural gas, crude oil, and aqueous fluids (e.g., produced water streams) and mixed streams of natural gas-crude oil-water.

Davidson et al. [Davidson, E.; Hall, J.; Temple, C., An environmentally friendly highly effective hydrogen sulfide scavenger for drilling fluids, SPE Drilling & Completion., 2004, 19(4): 229-234] describes the application of iron-gluconate for $H_2S$ scavenging from drilling fluids. Davidson et al. also discloses the $H_2S$ iron-gluconate scavenger in U.S. Pat. No. 6,746,611 B2.

U.S. Pat. No. 6,881,389 to Paulsen et al. (Paulsen) proposes a process for the removal of hydrogen sulfide and/or carbon dioxide from natural gas via absorption and disassociation utilizing a seawater contact system. U.S. Pat. No. 7,235,697 to Muller et al. (Muller) discloses a process for producing thiols, thioethers and disulfides by reacting olefins with hydrogen sulfide in the presence of water and carbon dioxide. U.S. Pat. No. 6,946,111 to Keller et al. (Keller) discloses a process for the $H_2S$ removal from a gas stream via the reaction of $H_2S$ with $O_2$ over a suitable catalyst. U.S. Pat. No. 5,215,728 to McManus (McManus) discloses a method for $H_2S$ scavenging using a polyvalent metal redox absorption solution.

Additionally, U.S. Pat. No. 6,444,185 to Nougayrede et al. (Nougayrede) discloses a process for the simultaneous desulfurization of sulfurous compounds such as $H_2S$, $SO_2$, COS and/or $CS_2$, where these sulfur-containing gases are oxidized and hydrolyzed at a temperature ranging from 180 to 700° C. U. S. 2015/0034319 A1 to Tylor (Tylor) discloses the use of triazine for $H_2S$ scavenging. Triazine and glyoxal are among the most widely used $H_2S$ scavengers in oil and gas industries. However, the reaction of triazine and glyoxal with $H_2S$ is slow when they are used in downhole injection applications. Another limitation of triazine and glyoxal is their low thermal stability. Furthermore, triazines components have high scaling tendency, which is undesirable. U.S. Pat. No. 6,495,117 to Lynn (Lynn) describes a process for the recovery of elemental sulfur from $H_2S$-containing gases by treating the $H_2S$-containing gases in a series of liquid-phase reactors.

On one hand, several technologies are proposed to facilitate the removal of Hg(II) and other heavy metals from contaminated waters, such as ion exchange, chemical precipitation, ultrafiltration, reverse osmosis, coagulation/flocculation, flotation, electrodialysis, adsorption, and photocatalysis. On the other hand, practical approaches have been developed in the art to facilitate $H_2S$ removal by the introduction of (i) complicated homogenous systems, (ii) sophisticated chemical agents, e.g., highly functionalized chelating agents, flammable oxidizing agents and costly stabilizers, and (iii) restricted application conditions, e.g., limited pH ranges, particular temperature ranges, and certain pressure requirements. However, a combined process of heavy metals removal from contaminated waters and the desulfurization of sour gases is yet to be developed. Hence, there is a need for developing such techniques, and apparatuses and protocols for the simultaneous treatment of heavy metal waste and sour gases.

In view of the forgoing, one objective of the present disclosure is to provide a process for simultaneous removal of hydrogen sulfide ($H_2S$) and heavy metals from mixture to generate purified aqueous composition and purified gas composition. A further objective of the present disclosure is to provide a process for electrolyzing the purified aqueous composition to form hydrogen gas.

SUMMARY

In an exemplary embodiment, a process for simultaneous removal of hydrogen sulfide ($H_2S$) and heavy metals from mixture is described. The process for simultaneous removal of $H_2S$ and heavy metals from mixture includes charging a contaminated aqueous composition containing heavy metal ions to a reactor. The process also includes passing a $H_2S$-containing gas composition via a plurality of gas spargers through the contaminated aqueous composition present in the reactor to form a $H_2S$-containing contaminated aqueous composition and a purified gas composition. The process further includes reacting the $H_2S$ from the $H_2S$-containing contaminated aqueous composition with the heavy metal ions in the $H_2S$-containing contaminated aqueous composition to form a metal sulfide precipitate in a metal-sulfide-containing contaminated aqueous composition. In addition, the process involves at least partially introducing the metal-sulfide-containing contaminated aqueous composition to a solid-liquid separator. Furthermore, the process also includes removing the metal sulfide precipitate from the metal-sulfide-containing contaminated aqueous composition to form a purified aqueous composition.

In some embodiments, the plurality of gas spargers is within the body of the contaminated aqueous composition to distribute the gas composition in the form of bubbles and is adjacent to a lower end of the reactor.

In some embodiments, the reactor is in fluid communication with the solid-liquid separator.

In some embodiments, the heavy metal ions are at least one selected from the group consisting of chromium (Cr) ions, nickel (Ni) ions, copper (Cu) ions, lead (Pb) ions, arsenic (As) ions, cadmium (Cd) ions, mercury (Hg) ions, aluminum (Al) ions, uranium (U) ions, strontium (Sr) ions, thallium (Tl) ions, zinc (Zn) ions, molybdenum (Mo) ions, tungsten (W) ions, manganese (Mn) ions, vanadium (V) ions, iron (Fe) ions, cobalt (Co) ions, and nickel (Ni) ions.

In some embodiments, the heavy metal ions are Hg(II) ions.

In some embodiments, each of the gas spargers has a colander-like porous structure with an average pore size in the range of about 1 μm to about 10 mm, and the plurality of gas spargers is arranged in a helical shape in four quadrants of the reactor with each quadrant containing at least one gas sparger.

In some embodiments, the gas sparger has a first edge and a second edge. In some embodiments, a ratio of a length of the gas sparger to a diameter of the reactor is in a range of 1:20 to 1:5. In some embodiments, the length of the gas sparger is a vertical distance measured between the first edge and the second edge. In some embodiments, a vertical distance between the center of the two adjacent helically arranged gas spargers is in a range of 100% to 400% of the outer diameter of the helical shape. In some embodiments, a horizontal distance between the center of the two adjacent helically arranged gas spargers is in a range of 50% to 200% of the length of the gas sparger.

In some embodiments, the contaminated aqueous composition comprises at least one liquid selected from the group consisting of tap water, ground water, distilled water, deionized water, saltwater, hard water, fresh water, and wastewater.

In some embodiments, the contaminated aqueous composition comprises at least one anionic species selected from nitrate, nitrite, sulfate, phosphate, fluoride, bromide, hydroxide, and chloride.

In some embodiments, the heavy metal ions are mixed-metal ions in the form of hydroxide salt, where the hydroxide salt of mixed-metal ions is supported on at least one support selected from the group consisting of a graphene, a graphene oxide, a reduced graphene oxide, an alumina, a carbon nanotube, an activated carbon, a metal organic framework (MOF), a zeolitic imidazolate framework (ZIF), and a covalent organic polymer (COP).

In some embodiments, the reactor is a bubble column reactor in the form of a vertical cylindrical reactor containing at least one propeller agitator disposed therein, wherein the vertical cylindrical reactor has a bottom portion, a vertically oriented cylindrical body portion and a top portion, wherein the bottom portion is cone shaped or pyramidal, wherein a plurality of recirculation tubes fluidly connects the bottom portion of the vertical cylindrical reactor with the body portion of the vertical cylindrical reaction.

In some embodiments, the reactor further comprises at least one reactor selected from the group consisting of a packed bed reactor, a slurry reactor, and a bubble column reactor.

In some embodiments, the vertically oriented cylindrical body portion of the reactor is fluidly connected to a solid-liquid separator, wherein the solid-liquid separator is fluidly connected to a mixing tank, wherein the mixing tank is fluidly connected to an electrochemical cell containing an anode and a cathode, wherein the electrochemical cell is fluidly connected to a recovery unit.

In some embodiments, the $H_2S$-containing gas composition is natural gas.

In some embodiments, the $H_2S$-containing gas composition further comprises at least one gas selected from the group consisting of nitrogen, argon, methane, ethane, ethylene, propylene, propane, butane, butene, butadiene, and isobutylene.

In some embodiments, the $H_2S$ is present in the gas composition at a concentration in a range of 10 to 200 parts per million by volume (ppmv) based on a total volume of the gas composition.

In some embodiments, the $H_2S$-containing gas composition is introduced to the reactor at a rate of 4 to 120 milliliters per minute (mL/min) per milligram of the metal ions in the contaminated aqueous composition.

In some embodiments, the heavy metal ions are present in the contaminated aqueous composition at a concentration in a range of 0.05 to 15 milligrams per milliliter (mg/mL).

In some embodiments, during the passing and reacting the contaminated aqueous composition is in contact with the $H_2S$-containing gas composition at a temperature in a range of from 15 to 40° C. and under a pressure of 0.9 to 1.2 bar.

In some embodiments, the Hg(II) ions are present in the contaminated aqueous composition at a concentration in a range of 0.1 to 1 mg/mL and the contaminated aqueous composition is in contact with the gas composition comprising 100 ppmv of $H_2S$ at a rate of 92 mL/min in the bubble column reactor, having a saturation time of 10 to 200 minutes.

In another exemplary embodiment, the process for simultaneous removal of $H_2S$ and heavy metals from mixture further includes electrolyzing the purified aqueous composition to form hydrogen gas. In one embodiment, the electrolyzing the purified aqueous composition to form hydrogen gas involves at least partially introducing the purified aqueous composition to a mixing tank under continuous agitation. In another embodiment, the electrolyzing involves charging an electrolyte solution to the mixing tank and mixing to form an electrolyte containing aqueous composition. In yet another embodiment, the electrolyzing involves at least partially introducing the electrolyte containing aqueous composition to an electrochemical cell containing an anode and a cathode. In a further embodiment, the electrolyzing includes applying a potential between the anode and cathode to produce hydrogen gas. In yet still another embodiment, both electrodes are at least partially immersed in the electrolyte containing aqueous composition.

In some embodiments, the electrolyte solution comprises iron(II) chloride and sodium chloride.

In some embodiments, a molar ratio of the heavy metal ions to iron(II) ions is in a range of 0.9:1 to 1.1:1.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
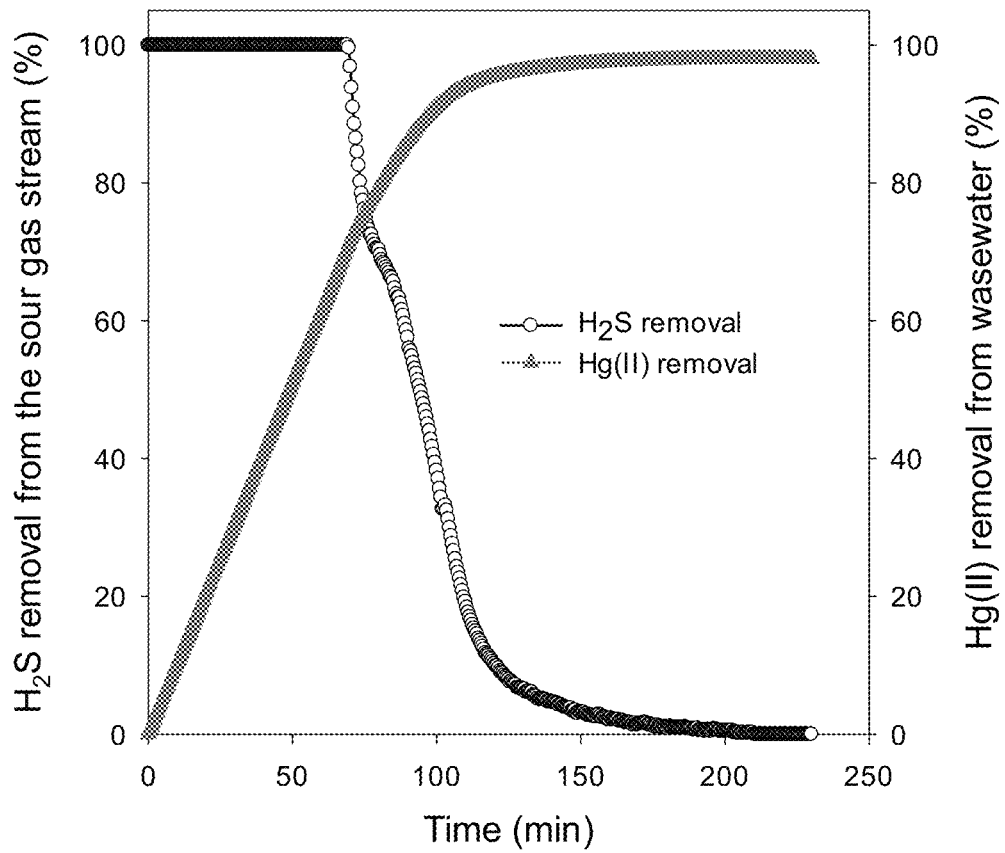
FIG. 1 illustrates changes in the concentrations of $H_2S$ in the exit gas stream and Hg(II) in water as a function of time, where the initial concentration of Hg(II) in water is 1 mg/mL and the water sample volume is 10 mL, according to certain embodiments.

In the following description, it is understood that other embodiments may be utilized, and structural and operational changes may be made without departure from the scope of the present embodiments disclosed herein.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "fluid" refers to a gas, a liquid, a mixture of gas and liquid, or a gas or liquid comprising dispersed solids, droplets and/or bubbles. The droplets and/or bubbles may be irregular or regular and may be similar or different in size.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a heterosubstituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

The present disclosure describes a process for simultaneous removal of hydrogen sulfide ($H_2S$) from sour gases and heavy metals (i.e., Hg(II)) from liquids in a bubble column reactor to meet the growing needs of desulfurization and waste water treatment on an industrial scale. The process further involves electrolyzing the purified aqueous composition to form hydrogen gas. In addition, the heavy metals are mixed metal ions in the form of hydroxide salt, which may further be supported on a support. The effectiveness of the said process and compound has been assessed by injecting a sour natural gas into a bubble column reactor containing aqueous Hg(II) solution. On one hand, the gas leaving the stirred tank reactor is continuously monitored and the concentration of $H_2S$ in the sweetened gas is continuously measured, enabling the construction of $H_2S$ breakthrough curves and the calculation of the amount of $H_2S$ scavenged. On the other hand, the water-insoluble mercury sulfide formed from reacting $H_2S$ and Hg(II) ions can then be removed from water by filtration or centrifugation.

According to a first aspect, the present disclosure relates to a process for simultaneous removal of hydrogen sulfide ($H_2S$) and heavy metals from mixture. The process involves (i) charging a contaminated aqueous composition containing heavy metal ions to a reactor, (ii) passing a $H_2S$-containing gas composition via a plurality of gas spargers through the contaminated aqueous composition present in the reactor to form a $H_2S$-containing contaminated aqueous composition and a purified gas composition, (iii) reacting the $H_2S$ from the $H_2S$-containing contaminated aqueous composition with the heavy metal ions in the $H_2S$-containing contaminated aqueous composition to form a metal sulfide precipitate in a metal-sulfide-containing contaminated aqueous composition, (iv) at least partially introducing the metal-sulfide-containing contaminated aqueous composition to a solid-liquid separator, and (v) removing the metal sulfide precipitate from the metal-sulfide-containing contaminated aqueous composition to form a purified aqueous composition.

Figure 6:
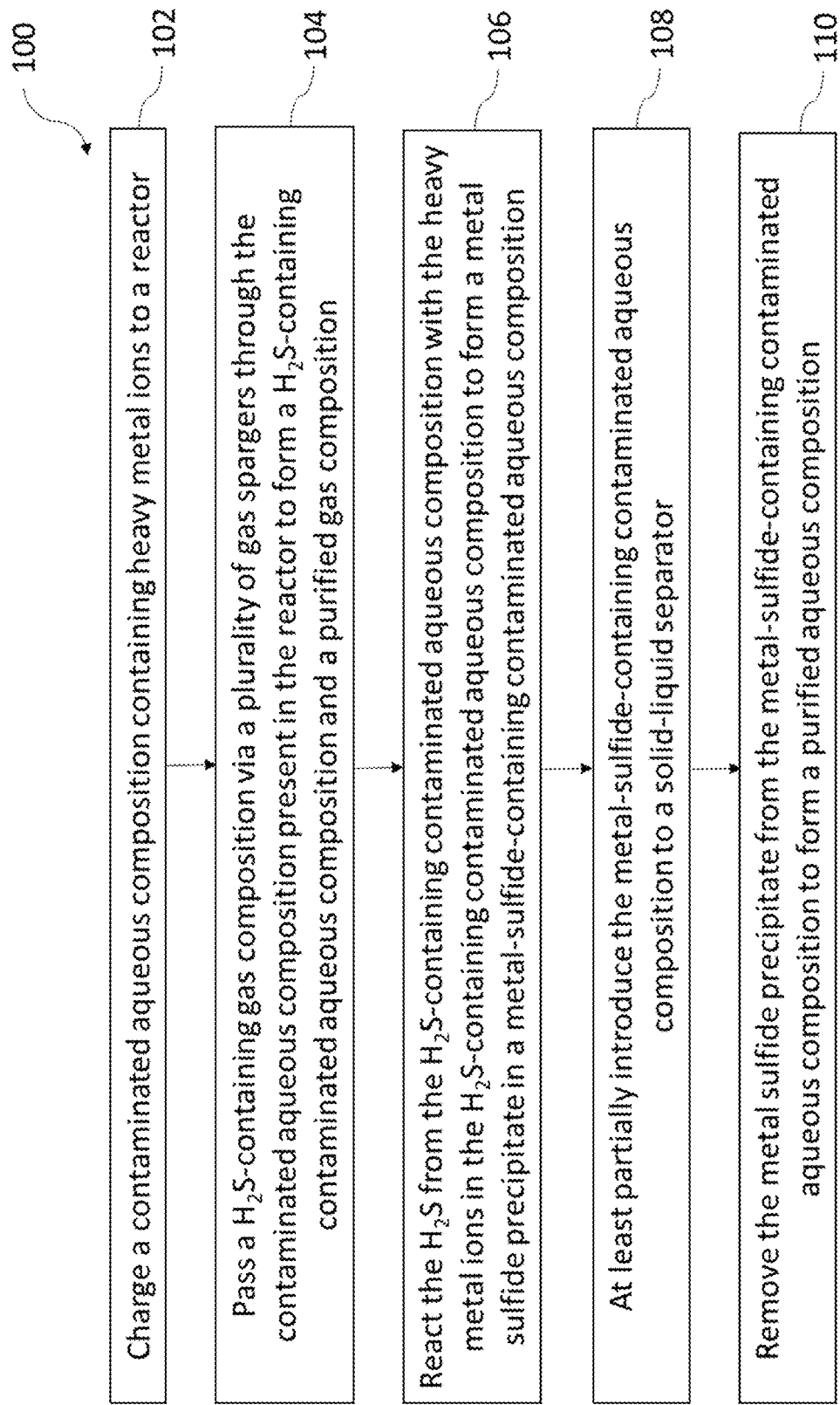
FIG. 6 is a schematic flow diagram of a process for simultaneous removal of hydrogen sulfide ($H_2S$) and heavy metals from mixture, according to certain embodiments.

Referring to FIG. 6, a schematic flow diagram of a process for simultaneous removal of $H_2S$ and heavy metals from mixture is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes charging a contaminated aqueous composition containing heavy metal ions to a reactor. In one exemplary embodiment, the aqueous composition includes an aqueous media, an oil, an oil-in-water emulsion, and/or a water-in-oil emulsion. In one embodiment, the aqueous composition is a sour oil. In a preferred embodiment, the aqueous composition is a sour water. In a more preferred embodiment, the aqueous composition contains at least one water selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation, and is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, the aqueous composition may further contain ethylene glycol, methanol, ethanol, propanol, isopropanol, n-butanol, ethyl acetate, pet ether, pentane, hexane(s), decalin, THF, dioxane, toluene, xylene(s), and/or o-dichlorobenzene. In some more other embodiments, the aqueous composition may contain a minority fraction of, water.

In some preferred embodiments, the aqueous composition comprises at least 50, 60, 70, 75, 80, 85, 90, 95, 96, 97, 97.5, 98, 99, 99.1, 99.5, or 99.9 wt. % $H_2O$, based upon a total weight of the liquid.

In some embodiments, the heavy metal ions are at least one selected from the group consisting of chromium (Cr) ions, nickel (Ni) ions, copper (Cu) ions, lead (Pb) ions, arsenic (As) ions, cadmium (Cd) ions, mercury (Hg) ions, aluminum (Al) ions, uranium (U) ions, strontium (Sr) ions, thallium (Tl) ions, zinc (Zn) ions, molybdenum (Mo) ions, tungsten (W) ions, manganese (Mn) ions, vanadium (V) ions, iron (Fe) ions, cobalt (Co) ions, and nickel (Ni) ions. In some preferred embodiments, the heavy metal ions are Hg(II) ions.

In some embodiments, the heavy metal ions are present in the contaminated aqueous composition at a concentration in a range of 0.05 to 15 milligrams per milliliter (mg/mL), preferably 0.1 to 10 mg/mL, preferably 0.25 to 7.5 mg/mL, preferably 0.5 to 5 mg/mL, preferably 0.75 to 2.5 mg/mL, or even more preferably 1 mg/mL. Other ranges are also possible.

In some embodiments, the contaminated aqueous composition comprises at least one anionic species selected from nitrate, nitrite, sulfate, phosphate, fluoride, bromide, hydroxide, and chloride. In some preferred embodiments, the anionic species may be chloride, hydroxide, and/or nitrate.

In some embodiments, the heavy metal ions are mixed-metal ions in the form of hydroxide salt, where the hydroxide salt of mixed-metal ions is at least one mixed-metal hydroxide selected from the group consisting of zinc-iron-aluminum (ZnFeAl) hydroxide, manganese-iron-aluminum (MnFeAl) hydroxide, cobalt-iron-aluminum (CoFeAl) hydroxide, and copper-iron-aluminum hydroxide (CuFeAl).

In some embodiments, the mixed-metal hydroxide is supported on at least one support selected from the group consisting of a graphene-based material, an alumina, a carbon nanotube, an activated carbon, a metal organic framework (MOF), a zeolitic imidazolate framework (ZIF), and a covalent organic polymer (COP). In some embodiments, the graphene supported mixed-metal hydroxide composite comprises at least one graphene-based material selected from the group consisting of graphene, graphyne, graphydiyne, graphene oxide, reduced graphene oxide, and exfoliated graphite.

In some preferred embodiments, the mixed-metal hydroxide is supported on graphene oxide (GO). In certain embodiments, the graphene oxide is in the form of sheet having a thickness of 0.5 to 50 nm, preferably 1 to 25 nm, or even more preferably about 15 nm. In certain embodiments, the graphene oxide comprises a plurality of holes in the basal plane therein formed by oxidation to form a network of interconnected graphene oxide nanoribbons between the plurality of holes in the basal plane, the plurality of holes having an average diameter in the range of 1 to 500 nm, preferably 50 to 250 nm, or even more preferably 100 to 150 nm. In certain embodiments, the graphene oxide has an oxygen content less than 35% by weight based on a total weight of the GO, preferably less than 15% by weight, preferably less than 10% by weight, or more preferably less than 5% by weight, based on a total weight of the GO. Other ranges are also possible.

In some further preferred embodiments, the graphene supported mixed-metal hydroxide is at least one selected from the group consisting of a graphene oxide supported zinc-iron-aluminum (ZnFeAl/GO) hydroxide, a graphene oxide supported manganese-iron-aluminum (MnFeAl/GO) hydroxide, a graphene oxide supported cobalt-iron-aluminum (CoFeAl/GO) hydroxide, and a copper-iron-aluminum (CuFeAl/GO) hydroxide.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise, they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanomaterial is activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanomaterial is carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

In some embodiments, the support is aluminum oxide. In some embodiments, the aluminum oxide is gamma (γ) aluminum oxide. In some embodiments, the aluminum oxide may include, but are not limited to, alpha (α) aluminum oxide and beta (β) aluminum oxide.

As used herein, the term "zeolitic," "zeolite," "zeolitic materials," and similar terms generally refer to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e. N—, and/or O—) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

In one or more embodiments, the ligand comprises an imidazole of formula (I) and a benzimidazole of formula (II):

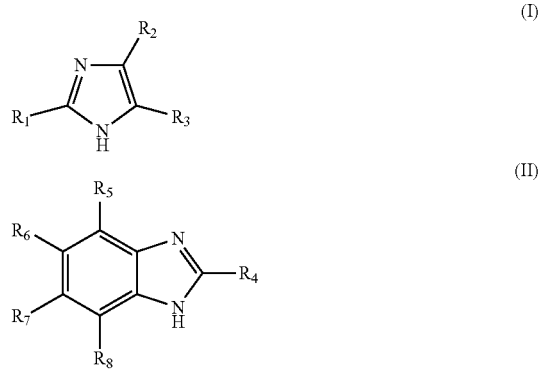

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole-4-carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl)benzimidazole, 5-cyanobenzimidazole, 2-benzimidazolyl)acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In one or more embodiments, a molar ratio between the imidazole of formula (I) to the benzimidazole of formula (II) ranges from 1:1 to 1:4, preferably 2:3 to 2:7, more preferably 4:7 to 1:3, even more preferably 5:9 to 2:5, or about 1:2.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In some embodiments, the porous support is aluminum oxide. In some embodiments, the aluminum oxide is gamma (γ) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

The mixed-metal hydroxide particles may contain a single type of mixed-metal hydroxide or may contain more than one type of mixed-metal hydroxides. Multiple types of the mixed-metal hydroxide particles may be used, which differ in various properties such as identity of composition of the mixed-metal hydroxide, size, shape, or other similar property. In general, the mixed-metal hydroxide particles may have any suitable shape as described above. The shape may be uniform or non-uniform. In some embodiments, the mixed-metal hydroxide has a delaminated structure comprising charged crystalline particles. In one or more embodiments, a distance between laminated layers is in a range of 0.5 to 5 nm, preferably 1 to 4.5 nm, preferably 1.5 to 4 nm, preferably 2 to 3 nm. In some embodiments, the particles of the mixed-metal hydroxide have a mean particle size in a range of 5 to 150 nm, preferably 7.5 to 125 nm, preferably 10 to 100 nm, preferably 15 to 90 nm. Other ranges are also possible.

In still yet some other embodiments, a weight ratio of the mixed-metal hydroxide to support is from 20:1 to 1:20, preferably 15:1 to 1:15, preferably 10:1 to 1:10, preferably 5:1 to 1:5, and more preferably 2:1 to 1:2. Other ranges are also possible.

In a further exemplary embodiment, the reactor is at least one reactor selected from the group consisting of a stirred tank reactor, a packed bed reactor, a slurry reactor, and a bubble column reactor. In some embodiments, the reactor is a bubble column reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the aqueous composition occupies at least $1/20$, $1/10$, $3/10$, $1/2$, $2/3$, $4/5$, or $9/10$ of the reactor volume. In some embodiments, the aqueous composition occupies no more than $10/11$, $9/10$, $4/5$, $2/3$, $1/2$, $3/10$, or $1/10$ f the reactor volume. In some embodiments, means of stirring or agitation may include magnetic stirring via magnetic spin bar, impellers, and/or ultrasonic waves. In certain embodiments, stirring or agitation may speed up the formation of metal sulfides.

Figure 5:
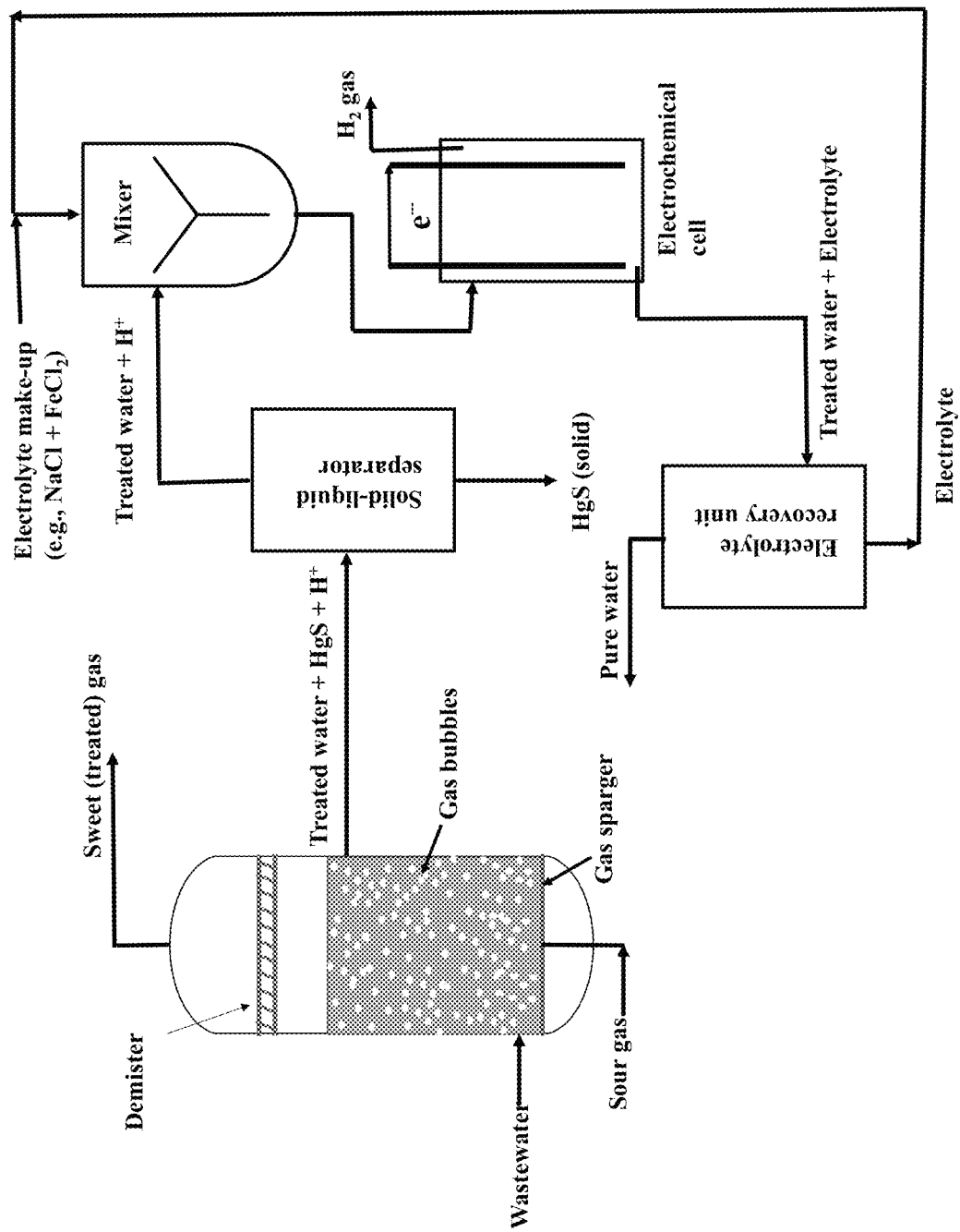
FIG. 5 is a design diagram of a process apparatus for simultaneous removal of hydrogen sulfide ($H_2S$) and heavy metals from mixture, according to certain embodiments.

In some embodiments, the reactor maybe a bubble column reactor in the form of a vertical cylindrical reactor as depicted in FIG. 5. In some embodiments, the reactor has a plurality of inlets and outlets for fluids at the bottom of the reactor. In some further embodiments, the reactor has a plurality of inlets and outlets for fluids at the top of the reactor. In a preferred embodiment the reactor has a plurality of inlets and outlets for liquid-suspended solids at the bottom of the reactor. In some further preferred embodiments, the reactor has a plurality of inlets for solids at the top of the reactor.

In order to ensure that the solid and suspended materials in the aqueous composition containing heavy metal ions remain in suspension, it is preferred that a series of recirculation tubes fluidly connect a lower portion of the vertical cylindrical reactor (preferably a bottom portion) with an upper portion or body portion of the vertical cylindrical reactor that contains the graphene supported mixed-metal hydroxide composite mixture and/or liquid materials present in the reactor. The recirculation tubes may fluidly connect to a conical bottom portion of the vertical cylindrical reactor representing the bottommost portion thereof. A plurality of recirculation routes is preferable. One or more pumping mechanisms functions to draw the aqueous composition from the bottom portion of the vertical cylindrical reactor and reintroduce the aqueous composition form at an upper portion of the body portion of the vertical cylindrical reactor, preferably at a point that is below the uppermost liquid line present inside the vertical cylindrical reactor. During operation one or more recirculation pumps having an upstream connection to an outlet at the bottom of the vertical cylindrical reactor and a downstream connection to the body portion of the vertical cylindrical reactor functions to keep the suspended materials in a suspended state thereby eliminating formation of a hardened plug of solid material at the bottom of the vertical cylindrical reactor. Preferably there are at least four recirculation tubes, one for each of four quadrants defining the cross-section of the vertical cylindrical reactor. The inlet points in the body portion of the vertical cylindrical reactor are preferably at a height of less than one half the total height of the body portion of the vertical cylindrical reactor preferably at a height of 0.3-0.45 of the total height of the body portion of the vertical cylindrical reactor, e.g., measured from the bottommost portion of the cylindrical shape to the topmost portion of the cylindrical shape not including and cone or extender. During operation both mechanical agitation by a propeller and mechanical agitation by the recirculation tubes may occur such that the solids materials inside the aqueous composition remain fully suspended without settling.

At step 104, the method 100 includes passing a $H_2S$-containing gas composition via a plurality of gas spargers through the contaminated aqueous composition present in the reactor to form a $H_2S$-containing contaminated aqueous composition and a purified gas composition.

In some embodiments, the $H_2S$-containing gas composition is natural gas.

In some embodiments, the $H_2S$-containing gas composition further comprises at least one gas selected from the group consisting of nitrogen, argon, methane, ethane, ethylene, propylene, propane, butane, butene, butadiene, and isobutylene. The gas composition may comprise at least 20, 40, 60, 80, 90, 95, 99.5, or 99.9 wt. % nitrogen, argon, methane, ethane, ethylene, propylene, propane, butane, butene, butadiene, and isobutylene, based on a total weight of the gas composition. Other ranges are also possible.

In some embodiments, the $H_2S$-containing gas composition may further comprise $CO_2$, and the $CO_2$ may be present in 2, 5, 10, 15, 20, 25, 30, 40, 50, 60, 65, 75, 85, 100, 150, 200, 250-fold the amount, or more, of the $H_2S$ based on moles. The gas composition may further contain CO, $H_2$, He, $NH_3$, $O_2$, and/or $O_3$, but may exclude any or all of these.

In some embodiments, the $H_2S$ is present in the gas composition at a concentration in a range of 10 to 200 parts per million by volume (ppmv), preferably 20 to 180 ppmv, preferably 40 to 160 ppmv, further preferably 60 to 140 ppmv, more preferably 80 to 12 ppmv, or even more preferably 100 ppmv, based on a total volume of the gas composition. Other ranges are also possible.

In some embodiments, the $H_2S$-containing gas composition is introduced to the reactor at a rate of 4 to 120 milliliters per minute (mL/min) per milligram of the heavy metal ions in the contaminated aqueous composition, preferably 8 to 100, preferably 12 to 80, preferably 16 to 60, preferably 20 to 40, or even more preferably 30 mL/min per milligram of the heavy metal ions in the contaminated aqueous composition. Other ranges are also possible.

In some embodiments, the contaminated aqueous composition present in the reactor is in contact with the $H_2S$-containing gas composition at a temperature in a range of from 15 to 40° C., preferably 20 to 35° C., preferably 25 to 30° C. under a pressure of 0.9 to 1.2 bar, preferable 0.95 to 1.15 bar, preferably 1.0 to 1.1 bar. Other ranges are also possible.

In one embodiment, the $H_2S$-containing gas composition is sour gas. In another embodiment, the reactor may include a closed top. In a further embodiment, the sour gas is introduced to the reactor through a gas sparger located at a lower portion of a body portion of the reactor. In some embodiments, heavy metal ions are mixed-metal ions in the form of hydroxide salt that are suspended in the contaminated aqueous composition. In some embodiments, the mixed-metal hydroxide is supported on a graphene support.

In some further embodiments, the graphene supported mixed-metal hydroxide particles are retained in contaminated aqueous composition by a particle trap located at an upper portion of the body portion of the reactor. In another embodiment, the purified gas composition may be accumulated in an upper region of a reactor. In yet another embodiment, the accumulated purified gas composition may be vented from the reactor through the outlets at the top of the reactor to the gas analyzer. In a preferred embodiment, the metal sulfide may be accumulated and settled in the liquid to the lower portion of the body portion of the reactor. In a further preferred embodiment, the metal sulfide accumulated may be removed from the contaminated aqueous composition through the outlets at the bottom of the reactor.

In some embodiments, the $H_2S$-containing gas composition may be passed into the contaminated aqueous composition containing heavy metal ions by a gas sparger within the body of the contaminated aqueous composition to distribute the gas composition in the form of small bubbles adjacent to a lower end of the reactor. The procedure may be operated as a continuous process or in intermittent manner and is particularly useful for scavenging operations. In some further embodiments, the $H_2S$-containing gas composition may be heated to a suitable temperature before passing the contaminated aqueous composition containing heavy metal ions. The heated $H_2S$-containing gas composition is then in direct contact with the heavy metal ions to convert substantially all $H_2S$ in the gas composition to metal sulfides.

In some embodiments, the gas sparger has a colander-like porous structure (e.g., a spherical conical shape, preferably a hemispherical shape) with an average pore size in the range of about 1 μm to about 10 mm, preferably from 100 μm to 1 mm, preferably 200 to 800 μm, preferably 300 to 700 μm, preferably 400 to 600 μm, or even more preferably 500 μm. Other ranges are also possible.

In some embodiments, the gas spargers are arranged with respect to one another in a helical pattern with a helix initiating in each of four quadrants of the reactor and each quadrant containing at least one unit of gas sparger (e.g., each helix made of a series of stacked gas spargers that spiral around the interior of the reactor around the axis of the reactor. In some embodiments, the helical shape has a constant diameter including an inner diameter and outer diameter with respect the apex of each sparger. In some embodiments, the gas sparger has a first edge and a second edge. In some embodiments, a ratio of a length of the gas sparger to a diameter of the reactor is in a range of from 1:10 to 1:2, preferably from 1:9 to 1:3, preferably from 1:8 to 1:4, preferably from 1:6 to 1:5. As used herein, the length of the gas sparger is a vertical distance measured between the first edge and the second edge. Other ranges are also possible.

In some embodiments, a vertical distance between the center of the two adjacent helically arranged gas spargers is in a range of 100% to 400% of the outer diameter of the helical shape, preferably 120% to 360%, preferably 140% to 320%, preferably 160% to 280%, preferably 180% to 240%, or even more preferably about 200% of the outer diameter of the helical shape. In some embodiments, a horizontal distance between the center of the two adjacent helically arranged gas spargers is in a range of 50% to 200% of the length of the gas sparger, preferably 75% to 150%, or even more preferably about 100% of the length of the gas sparger. Other ranges are also possible At step 106, the method 100 includes reacting the $H_2S$ from the $H_2S$-containing contaminated aqueous composition with the heavy metal ions in the $H_2S$-containing contaminated aqueous composition to form a metal sulfide precipitate in a metal-sulfide-containing contaminated aqueous composition. In some embodiments, the heavy metal ions in the contaminated aqueous composition may react with the H$_2$S from the H$_2$S-containing gas composition optionally in the presence of a support to form a metal sulfide and a purified gas composition, as depicted in equation (1) below:

$$Hg(II)_{(aq.)} + H_2S_{(aq.)} \leftrightharpoons HgS_{(s)}\downarrow + 2H^+ \tag{1}$$

At step 106, the inventive method 100 may be carried out at pHs in the neutral range and/or above 4, though the efficiency of the H$_2$S removal should be within 90% across the pH range of 2 to 13, 3 to 11, 4 to 10, 5 to 8, or 6 to 7.5. No particular considerations need to be taken regarding pH, and acceptable reaction pHs will generally be at the ambient/natural conditions of water available.

In some further embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some even further embodiments, the metal-sulfide-containing contaminated aqueous composition occupies at least ¹⁄₂₀, ¹⁄₁₀, ³⁄₁₀, ½, ⅔, ⅘, or ⁹⁄₁₀ of the reactor volume. In still yet some other embodiments, the metal-sulfide-containing contaminated aqueous composition occupies no more than ¹⁰⁄₁₁, ⁹⁄₁₀, ⅘, ⅔, ½, ³⁄₁₀, or ¹⁄₁₀ of the reactor volume.

In some embodiments, exhaustion of the capacity of heavy metal ions in the contaminated aqueous composition to absorb and convert hydrogen sulfide to metal sulfides may be detected in any convenient manner and to form an exhausted reaction mixture containing metal sulfides. In some further preferred embodiments, the exhausted reaction mixture then is replenished with the contaminated aqueous composition containing heavy metal ions, or by the addition of the heavy metal ions. Metal sulfides may be removed from the exhausted reaction mixture through the outlets at the bottom of the reactor.

At step 108, the method 100 includes at least partially introducing the metal-sulfide-containing contaminated aqueous composition to a solid-liquid separator. In general, the solid-liquid separator is adapted to receive a slurry stream containing the metal-sulfide from the bubble column reactor and to separate the slurry stream into a concentrated slurry stream and a resultant liquid stream, wherein the concentrated slurry stream contains a greater concentration of the metal-sulfide solids than the slurry stream, and further wherein the resultant liquid stream does not include all of the liquid present in the slurry stream.

At step 110, the method 100 includes removing the metal sulfide precipitate from the metal-sulfide-containing contaminated aqueous composition to form a purified aqueous composition. In accordance with equation (1), the molar ratio of H$_2$S scavenged to the metal sulfide precipitate is 1:1, hence the amount of metal sulfide precipitate formed in the reaction can be calculated from the amount of H$_2$S scavenged as a function of time using the following equation (2):

$$H_2S \text{ scavenged (mole)} = \frac{Q \cdot \rho_{H_2S} \cdot \int_0^{t_S} (C_{in} - C_{out}) dt}{M_{H_2S}} \tag{2}$$

where Q is the inlet gas flow rate, $\rho_{H_2S}$ is H$_2$S density (equivalent to 1.391 mg/mL at room temperature and atmospheric pressure), $M_{H_2S}$ is the molecular weight of H$_2$S, $t_S$ is the saturation time (i.e., when H$_2$S concentration in the outlet gas stream is the same as in the inlet gas stream), $C_{in}$, and $C_{out}$ are the concentrations of H$_2$S in the inlet and outlet gas streams, respectively.

As used herein, the term "breakthrough time" refers to the elapsed time between initial contact of the heavy metal ions in the contaminated aqueous composition with the H$_2$S-containing gas composition and the time at which H$_2$S is detected in the purified gas composition. In accordance with the present disclosure, the detection limit for H$_2$S in a gas composition is 0.5 ppm, based on a total weight of the gas composition.

As used herein, the term "saturation time" refers to the time during which the adsorbent is saturated (in equilibrium) with the adsorbate.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of H$_2$S taken up by the heavy metal ions.

Figure 2:
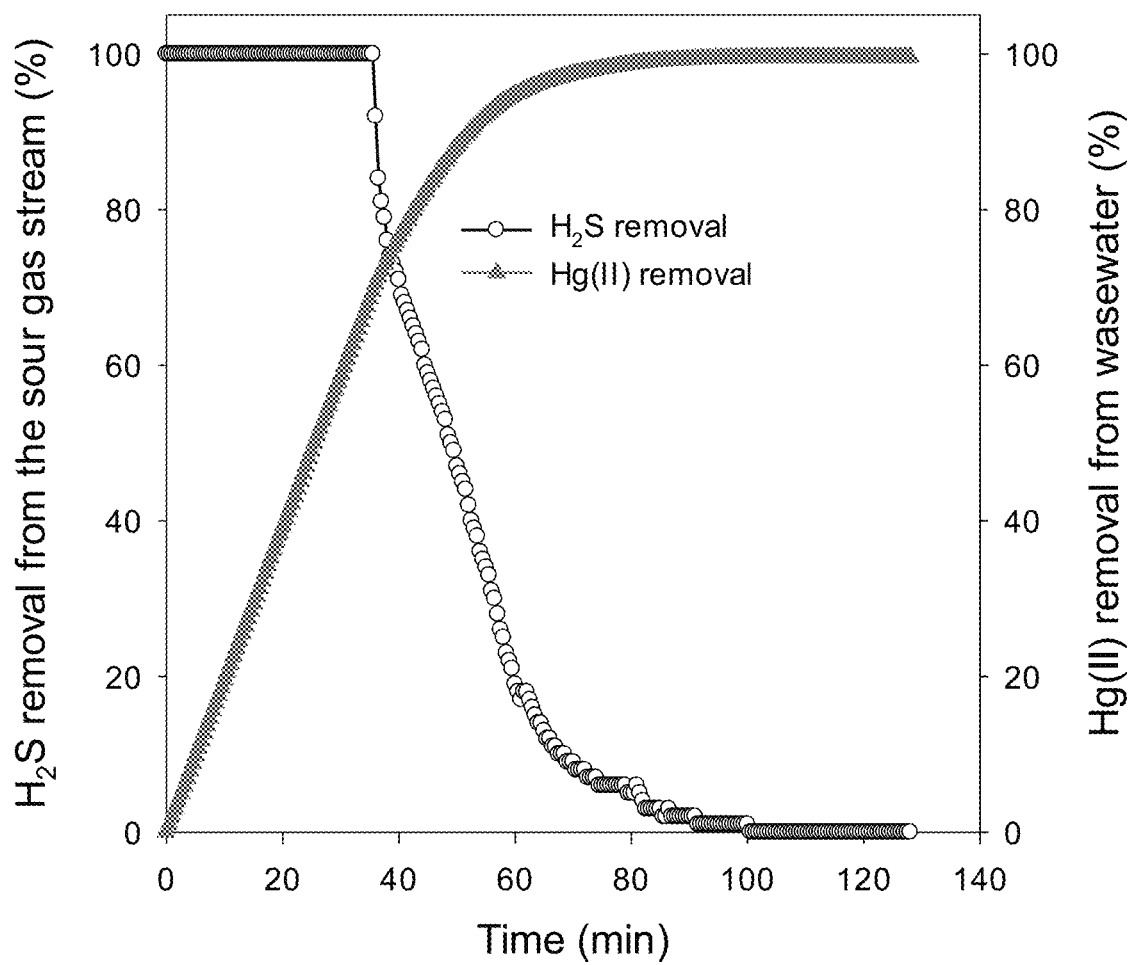
FIG. 2 illustrates changes in the concentrations of $H_2S$ in the exit gas stream and Hg(II) in water as a function of time, where the initial concentration of Hg(II) in water is 0.5 mg/mL and the water sample volume is 10 mL, according to certain embodiments.
Figure 3:
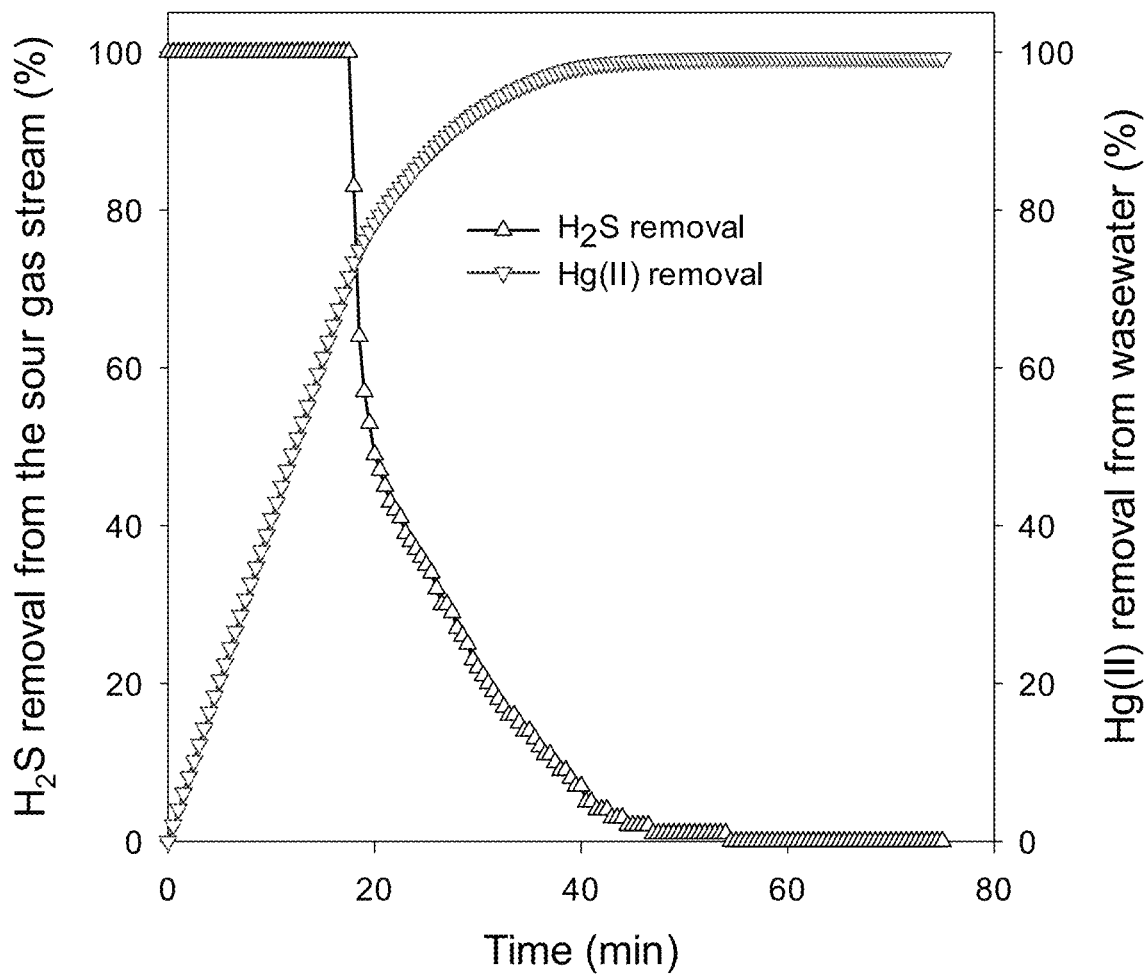
FIG. 3 illustrates changes in the concentrations of $H_2S$ in the exit gas stream and Hg(II) in water as a function of time, where the initial concentration of Hg(II) in water is 0.25 mg/mL and the water sample volume is 10 mL, according to certain embodiments, according to certain embodiments.
Figure 4:
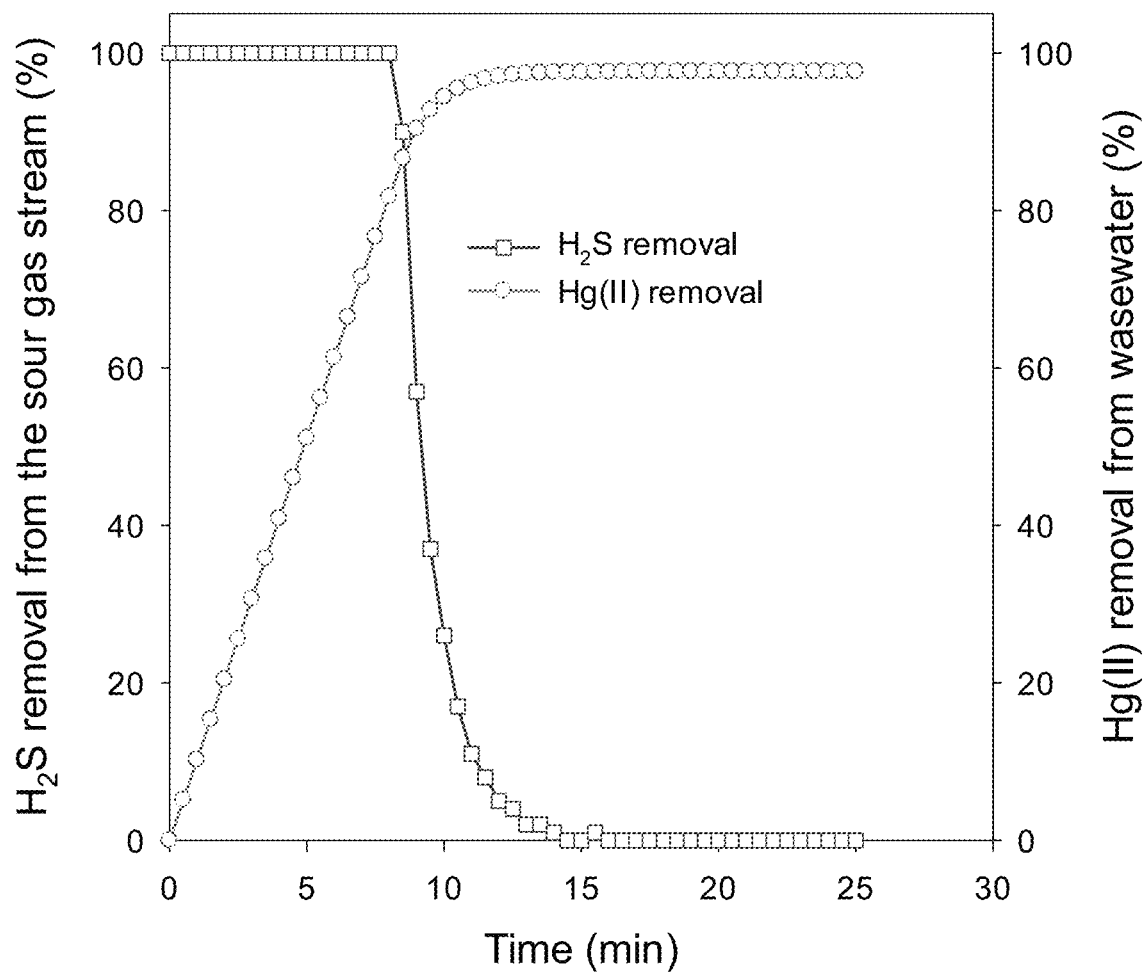
FIG. 4 illustrates changes in the concentrations of $H_2S$ in the exit gas stream and Hg(II) in water as a function of time, where the initial concentration of Hg(II) in water is 0.1 mg/mL and the water sample volume is 10 mL, according to certain embodiments, according to certain embodiments.

As depicted in FIG. 1, in some embodiments, the H$_2$S content in the purified gas composition after adsorbing by the heavy metal ions present in the contaminated aqueous composition is no more than 100 ppmv, 80 ppmv, 60 ppmv, 40 ppmv, 20 ppmv, or 10 ppmv, based on a total volume of the purified gas composition for 50 to 100 minutes, preferable 60 to 90 minutes, preferable 70 to 80 minutes, or even more preferably about 75 minutes of contact with the heavy metal ions at a temperature in a range of from 15 to 40° C., and under a pressure of 0.9 to 1.2 bar. In some further embodiments, the heavy metal ions in the contaminated aqueous composition after reacting with the H$_2$S from the H$_2$S-containing contaminated aqueous composition is no more than 1 mg/mL, 0.8 mg/mL, 0.6 mg/mL, 0.4 mg/mL, 0.2 mg/mL, 0.1 mg/mL, 0.05 mg/mL, or 0.01 mg/mL, based on a total volume of the contaminated aqueous composition for 5 to 180 minutes, preferable 50 to 150 minutes, preferable 70 to 130 minutes, or even more preferably about 110 minutes of contact with the H$_2$S at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible As depicted in FIG. 2, concentration changes of H$_2$S in the exit gas stream and heavy metal ions in water as a function of time are illustrated, respectively. In some embodiments, the H$_2$S content in the purified gas composition after adsorbing by the heavy metal ions present in the contaminated aqueous composition is no more than 100 ppmv, 80 ppmv, 60 ppmv, 40 ppmv, 20 ppmv, or 10 ppmv, based on a total volume of the purified gas composition for 20 to 60 minutes, preferable 25 to 55 minutes, preferable 30 to 50 minutes, or even more preferably about 40 minutes of contact with the heavy metal ions at a temperature in a range of from 15 to 40° C., and under a pressure of 0.9 to 1.2 bar. In some further embodiments, the heavy metal ions in the contaminated aqueous composition after reacting with the H$_2$S from the H$_2$S-containing contaminated aqueous composition is no more than 0.5 mg/mL, 0.4 mg/mL, 0.2 mg/mL, 0.1 mg/mL, 0.05 mg/mL, or 0.01 mg/mL, based on a total volume of the contaminated aqueous composition for 5 to 100 minutes, preferable 30 to 90 minutes, preferable 60 to 80 minutes, or even more preferably about 70 minutes of contact with the $H_2S$ at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible As depicted in FIG. 3, concentration changes of $H_2S$ in the exit gas stream and heavy metal ions in water as a function of time are illustrated, respectively. In some embodiments, the $H_2S$ content in the purified gas composition after adsorbing by the heavy metal ions present in the contaminated aqueous composition is no more than 100 ppmv, 80 ppmv, 60 ppmv, 40 ppmv, 20 ppmv, or 10 ppmv, based on a total volume of the purified gas composition for 5 to 40 minutes, preferable 10 to 30 minutes, preferable 15 to 25 minutes, or even more preferably about 20 minutes of contact with the heavy metal ions at a temperature in a range of from 15 to 40° C., and under a pressure of 0.9 to 1.2 bar. In some further embodiments, the heavy metal ions in the contaminated aqueous composition after reacting with the $H_2S$ from the $H_2S$-containing contaminated aqueous composition is no more than 0.25 mg/mL, 0.2 mg/mL, 0.1 mg/mL, 0.05 mg/mL, or 0.01 mg/mL, based on a total volume of the contaminated aqueous composition for 5 to 60 minutes, preferable 15 to 50 minutes, preferable 25 to 40 minutes, or even more preferably about 30 minutes of contact with the $H_2S$ at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300400, 500, 600, 750, or 900° C. Other ranges are also possible As depicted in FIG. 4, concentration changes of $H_2S$ in the exit gas stream and heavy metal ions in water as a function of time are illustrated, respectively. In some embodiments, the $H_2S$ content in the purified gas composition after adsorbing by the heavy metal ions present in the contaminated aqueous composition is no more than 100 ppmv, 80 ppmv, 60 ppmv, 40 ppmv, 20 ppmv, or 10 ppmv, based on a total volume of the purified gas composition for 1 to 20 minutes, preferable 3 to 17 minutes, preferable 6 to 14 minutes, or even more preferably about 10 minutes of contact with the heavy metal ions at a temperature in a range of from 15 to 40° C., and under a pressure of 0.9 to 1.2 bar. In some further embodiments, the heavy metal ions in the contaminated aqueous composition after reacting with the $H_2S$ from the $H_2S$-containing contaminated aqueous composition is no more than 0.1 mg/mL, 0.05 mg/mL, or 0.01 mg/mL, based on a total volume of the contaminated aqueous composition for 1 to 20 minutes, preferable 3 to 18 minutes, preferable 6 to 16 minutes, or even more preferably about 12 minutes of contact with the $H_2S$ at a temperature in a range of from 15 to 40° C., and under a pressure of 0.9 to 1.2 bar. These rates can be increased by a factor of 1.1, 1.2, 1.25, 1.33, 1.4, 1.45, 1.5, 1.6, 1.67, 1.75, 1.85, 2, 2.25, 2.5, 2.75, 3, 3.5, 4, 5, 6, 7.5, or even 10, by increasing the reaction temperature from 25 to 35, 50, 75, 100, 125, 150, 175, 200, 250, 300, 400, 500, 600, 750, or 900° C. Other ranges are also possible According to a second aspect, the present disclosure relates to a process for electrolyzing the purified aqueous composition to form hydrogen gas. The process for electrolyzing the purified aqueous composition to form hydrogen gas includes (i) at least partially introducing the purified aqueous composition to a mixing tank under continuous agitation, (ii) charging an electrolyte solution to the mixing tank and mixing to form an electrolyte containing aqueous composition, (iii) at least partially introducing the electrolyte containing aqueous composition to an electrochemical cell containing an anode and a cathode, and (iv) applying a potential between the anode and cathode to produce hydrogen gas.

FIG. 5 is a design diagram of a process apparatus for simultaneous removal of $H_2S$ and heavy metals from mixture, and electrolyzing the purified aqueous composition to form hydrogen gas. In one embodiment, the vertically oriented cylindrical body portion of the reactor is fluidly connected to a solid-liquid separator. In one embodiment, the solid-liquid separator is fluidly connected to a mixing tank. In yet another embodiment, the mixing tank is fluidly connected to an electrochemical cell containing an anode and a cathode. In still another embodiment, the electrochemical cell is fluidly connected to a recovery unit.

In some embodiments, the electrolyte solution comprises iron(II) chloride and sodium chloride. In some preferred embodiments, iron(II) chloride is present in the electrolyte containing aqueous composition at a concentration in a range of 0.01 to 1 mmol/L, preferably 0.05 to 0.5 mmol/L, preferably 0.1 to 0.3 mmol/L, or even more preferably 0.2 mmol/L. In some further preferred embodiments, sodium chloride is present in the electrolyte containing aqueous composition at a concentration in a range of 0.01 to 1 mmol/L, preferably 0.05 to 0.5 mmol/L, preferably 0.1 to 0.3 mmol/L, or even more preferably 0.2 mmol/L. In some more preferred embodiments, a molar ratio of iron(II) ions to sodium irons is in a range of 0.9:1 to 1.1:1, preferably 0.92:1 to 1.08:1, preferably 0.94:1 to 1.04:1, preferably 0.96:1 to 1.02:1, or even more preferably 1. In some most preferred embodiments, a molar ratio of the heavy metal ions to iron(II) ions is in a range of 0.9:1 to 1.1:1, preferably 0.92:1 to 1.08:1, preferably 0.94:1 to 1.04:1, preferably 0.96:1 to 1.02:1, or even more preferably 1. Other ranges are also possible.

In the electrochemical cell, the following reactions may take place at the anode and cathode, respectively:

$$2FeCl_2 + 2Cl^- \Rightarrow 2\ FeCl_3 + 2e^- \qquad (3)$$

$$2H^+ + 2e^- \Rightarrow H_2\uparrow \qquad (4)$$

In some embodiments, catalyst may be added to the aqueous composition containing electrolyte to aid the electrolyzing. In some embodiments, the catalyst is at least one selected from the group consisting of platinum, tungsten carbide, nickel, nickel alloys, stainless steel, and alloys. In some preferred embodiments, the resulting aqueous composition after electrolyzing containing $FeCl_3$ and sodium irons may be recovered in a recovery unit. In some embodiments, the electrolyte in the resulting aqueous composition may be recovered and recycled back to the mixer. In some further preferred embodiments, $FeCl_3$ may be reduced to $FeCl_2$ before recycling.

Aspects of the invention provide two or three-phase processes for simultaneous removal of $H_2S$ and heavy metals from mixture, i.e., a gas composition comprising a hydrocarbon and $H_2S$, such as a sour natural gas, biogas, refinery gas, syn gas, cracking off-gas or at least partially purified methane, ethane, ethylene, propylene, propane, butane, butene, butadiene, and/or isobutylene gas(es). Gas phases may comprise $H_2S$, $CO_2$, and a hydrocarbon, e.g., methane. Liquid phases, or the contaminated aqueous composition containing heavy metal ions within the invention, when present, may comprise or consist essentially of water, i.e., at least 75, 80, 85, 90, 91, 92, 92.5, 93, 94, 95, 96, 97, 97.5, 98, 99 99.1, 99.5, 99.9, 99.99, 99.999, or 99.9999 wt. % of a total weight of the liquid phase weight being water. The gas(es) may be continuously bubbled through a stirred tank reactor, contacting with the heavy metal ions, in an air or at least partially inert atmosphere or within the bulk of liquid phase, e.g., water, an aqueous mixture/solution, an organic phase.

According to an inventive two or three-phase processes for scavenging $H_2S$ from a $H_2S$-containing gas composition, in certain aspects, the Hg(II) ions are present in the contaminated aqueous composition at a concentration in a range of 0.1 to 1 mg/mL and the contaminated aqueous composition is in contact with the gas composition comprising 100 ppmv of $H_2S$ at a rate of 92 mL/min in the bubble column reactor, having a saturation time of 10 to 200 minutes.

The examples below are intended to further illustrate protocols for preparing, characterizing, and using the graphene supported mixed-metal hydroxide composite and for performing the method described above and are not intended to limit the scope of the claims.

Where a numerical limit or range is stated herein, the endpoints are included. Also, all values and subranges within a numerical limit or range are specifically included as if explicitly written out.

EXAMPLES

The following examples describe and demonstrate a process for simultaneous removal of hydrogen sulfide ($H_2S$) and heavy metals from mixture. The examples are provided solely for illustration and are not to be construed as limitations of the present disclosure, as many variations thereof are possible without departing from the spirit and scope of the present disclosure.

Example 1

10 mL of water containing 1 mg/mL of Hg(II) is placed in a bubble column reactor. Sour gas stream containing $H_2S$ (100.2 ppmv) and the balance methane is introduced at a flow rate of 92 mL/min. The gas exiting the reactor is sent to an E125 gas detector with a detection limit of 0.5 ppm. The exit gas was monitored and the concentration of $H_2S$ in the treated gas (i.e., desulfurized gas) was continuously recorded. The amount of $H_2S$ scavenged was calculated as a function of time according to equation (2) below:

$$H_2S \text{ scavenged (mole)} = \frac{Q \cdot \rho_{H_2S} \cdot \int_0^{t_S}(C_{in} - C_{out})dt}{M_{H_2S}} \quad (2)$$

where Q is the inlet gas flow rate, $\rho_{H_2S}$ is $H_2S$ density (equivalent to 1.391 mg/mL at room temperature and atmospheric pressure), $M_{H_2S}$ is the molecular weight of $H_2S$, $t_S$ is the saturation time (i.e., when $H_2S$ concentration in the outlet gas stream is the same as in the inlet gas stream), $C_{in}$, and $C_{out}$ are the concentrations of $H_2S$ in the inlet and outlet gas streams, respectively.

The amount of Hg(II) reacted with $H_2S$ to form insoluble HgS was calculated with the reaction stoichiometric equation (1). With the amount of Hg(II) reacted being computed, the change in the Hg(II) concentration in the aqueous phase was calculated as depicted in FIG. 1.

$$Hg(II)_{(aq.)} + H_2S_{(aq.)} \rightleftharpoons HgS_{(s)}\downarrow + 2H^+ \quad (1)$$

Example 2

10 mL of water containing 0.5 mg/mL of Hg(II) is placed in a bubble column reactor. Sour gas stream containing $H_2S$ (100.2 ppmv) and the balance methane is introduced at a flow rate of 92 mL/min. The gas exiting the reactor is sent to an $H_2S$ gas detector with a detection limit of 0.5 ppm. The exit gas was monitored and the concentration of $H_2S$ in the treated gas (i.e., desulfurized gas) was continuously recorded. The amount of $H_2S$ scavenged was calculated as a function of time according to equation (2). The amount of Hg(II) reacted with $H_2S$ to form insoluble HgS was calculated with the reaction stoichiometric equation (1) as depicted in FIG. 2.

Example 3

10 mL of water containing 0.25 mg/mL of Hg(II) is placed in a bubble column reactor. Sour gas stream containing $H_2S$ (100.2 ppmv) and the balance methane is introduced at a flow rate of 92 mL/min. The gas exiting the reactor is sent to an $H_2S$ gas detector with a detection limit of 0.5 ppm. The exit gas was monitored and the concentration of $H_2S$ in the treated gas (i.e., desulfurized gas) was continuously recorded. The amount of $H_2S$ scavenged was calculated as a function of time according to equation (2). The amount of Hg(II) reacted with $H_2S$ to form insoluble HgS was calculated with the reaction stoichiometric equation (1) as depicted in FIG. 3.

Example 4

10 mL of water containing 0.1 mg/mL of Hg(II) is placed in a bubble column reactor. Sour gas stream containing $H_2S$ (100.2 ppmv) and the methane $N_2$ is introduced at a flow rate of 92 mL/min. The gas exiting the reactor is sent to an $H_2S$ gas detector with a detection limit of 0.5 ppm. The exit gas was monitored and the concentration of $H_2S$ in the treated gas (i.e., desulfurized gas) was continuously recorded. The amount of $H_2S$ scavenged was calculated as a function of time according to equation (2). The amount of Hg(II) reacted with $H_2S$ to form insoluble HgS was calculated with the reaction stoichiometric equation (1) as depicted in FIG. 4.

Example 5

FIG. 1 shows the changes in the concentrations of $H_2S$ in the exit gas stream and Hg(II) in water as a function of time obtained at the initial concentration of 1 mg/mL of Hg(II).

Example 6

FIG. 2 shows the changes in the concentrations of $H_2S$ in the exit gas stream and Hg(II) in water as a function of time obtained at the initial concentration of 0.5 mg/mL of Hg(II).

Example 7

FIG. 3 shows the changes in the concentrations of $H_2S$ in the exit gas stream and Hg(II) in water as a function of time obtained at the initial concentration of 0.25 mg/mL of Hg(II).

Example 8

FIG. 4 shows the changes in the concentrations of $H_2S$ in the exit gas stream and Hg(II) in water as a function of time obtained at the initial concentration of 0.1 mg/mL of Hg(II).

Example 9

The formed HgS solid in the bubble column reactor is kept suspended in the reactor through the bubbling of the sour gas, which provided agitation. If the gas bubbling is insufficient to prevent the HgS solid from settling, (i) the precipitated HgS solid can be collected from the bottom of the column, (ii) impeller might be installed in the column to keep the HgS solid suspended, or/and (iii) the bubble column reactor might be replaced with a stirred tank reactor.

The gas leaving the top of the bubble column reactor can be free of $H_2S$ or until most of the dissolved Hg(II) ions in the contaminated composition are consumed. The breakthrough time represents the time when the concentration of the dissolved Hg(II) ions in the contaminated composition is insufficient to capture and react with the $H_2S$ molecules. After the breakthrough time $H_2S$ is detected in the outlet gas stream. The concentration of $H_2S$ in the outlet gas stream increases with time until the concentration of the dissolved Hg(II) ions in the contaminated composition is vanished or the residence time of $H_2S$ in the reaction medium (the water) is not sufficient enough to ensure the collision of the $H_2S$ molecules with the remaining dissolved Hg(II) ions in the contaminated composition. If the latter is the case, the remaining traces of heavy metal ion(s) can be converted in metal sulfides and being removed from water by either decreasing the inlet gas flow rate or increasing the concentration of $H_2S$ in the entering sour gas stream.

The development of bubble column process for simultaneous removal of hydrogen sulfide ($H_2S$) and heavy metals from mixture. The $H_2S$-containing gas composition can be natural gas, biogas or any $H_2S$-containing gas (e.g., refinery gas). The heavy metal in the liquid phase can be any dissolved heavy metal that can react with $H_2S$ and form water-insoluble products. Water contaminated with mixtures of heavy metals can also be used to scavenge $H_2S$ from sour gases. The reaction between the dissolved heavy metal(s) in water and $H_2S$ in the sour gas can be optimized via the alteration of the inlet gas flow rate, the concentration of $H_2S$ in the inlet gas, the height of the liquid in the bubble column, the concentration and type of heavy metal ions present in the liquid phase, and the chemistry and the physical properties of the liquid phase. Instead of the bubble column reactor, the concurrent sour gas desulfurization and water purification (i.e., removal of heavy metal ions) can be carried out in a stirred tank reactor, and/or a slurry reactor.

It is also noteworthy to mention that the rate of removal can be adjusted depending on the initial Hg(II) concentration, $H_2S$ concentration in the $H_2S$-containing gas composition as well as the sour gases flow rate. The initial Hg(II) ions can be supported on a support such that it can form a thick reaction slurry (i.e., slurry phase reaction). Additionally, the stirring speed, medium pH, volume, reaction temperature, pressure, and gas inlet flow rate can be adjusted to meet the reactor configurations and design parameters.

Example 10

A stream containing the treated contaminated composition, the formed HgS, and $H^+$ is withdrawn from the reactor and send to a solid-liquid separator (e.g., filtration or centrifugation unit) in order to remove the suspended HgS solid as depicted in FIG. 5. The solid-free stream leaving the solid-liquid separator is mixed with an electrolyte solution (e.g., an aqueous solution of $FeCl_2$ and NaCl) in the mixer before sending the resultant mixture into an electrochemical cell. In the electrochemical cell, the following reactions may take place at the anode and cathode, respectively:

$$2FeCl_2 + 2Cl^- \Rightarrow 2FeCl_3 + 2e^- \qquad (3)$$

$$2H^+ + 2e^- \Rightarrow H_2\uparrow \qquad (4)$$

Reaction (3) takes place in the anode where the dissociated 2 moles of chloride ion from the added salt (e.g., NaCl) react with 2 moles of $FeCl_2$ to from 2 moles of $FeCl_3$ and release 2 moles of electrons. The released electrons flow through the external wire to the cathode where they combine with 2 moles of $H^+$ (initially formed in the bubble column reactor and brought by water to the electrochemical cell) to form one mole of hydrogen gas that can be collected and purified if needed. Variety of catalysts (e.g., platinum, tungsten carbide, nickel and nickel alloys, stainless steel alloys, etc.) can be used added to aid the electrolyzing reaction. The water containing the electrolyte (e.g., $FeCl_3$, $Na^+$) leaves the electrochemical and enters the electrolyte recovery unit, where the electrolyte can be recovered (if needed) and recycled back to the mixer. Before recycling, $FeCl_3$ should be reduced to $FeCl_2$. Pure water leaves the electrolyte recovery unit and can be further refined if needed.

Example 11: Application in Sour Oil Desulfurization

The liquid media can be wastewater containing heavy metals in addition to other organic and inorganic pollutants. Sour water and water containing heavy metals can be treated using this invention. Adding Hg(II) and/or other appropriate heavy metal ions to sour water will bring the dissolved $H_2S$ in contact with the dissolved heavy metal ions and catalyze the conversion of both $H_2S$ and the heavy metal ions. During the reaction of the dissolved heavy metal ions with $H_2S$ molecules, protons will be produced. The formed protons can be converted to hydrogen fuel via the electrolyzing processes described above.

Sour oils can also be treated using the invention disclosed herein as along as the heavy metals can easily mix with the sulfurous components in the oil phase. To achieve this, first the sour oil has to be emulsified in water or vice versa. Then, during agitation/stirring of the emulsion, the contact between the sulfur-bearing components in the emulsified oil and the heavy metal ions might promote the desulfurization of the sour oils and the consumption of heavy metal ions.

Numerous modifications and variations of the present disclosure are possible in light of the above teachings. It is therefore to be understood that within the scope of the appended claims, the invention may be practiced otherwise than as specifically described herein.

The invention claimed is:
1. A process for simultaneous removal of hydrogen sulfide ($H_2S$) and heavy metals from mixture, comprising:
    charging a contaminated aqueous composition containing heavy metal ions to a reactor;
    passing a $H_2S$-containing gas composition via a plurality of gas spargers through the contaminated aqueous composition present in the reactor to form a $H_2S$-containing contaminated aqueous composition and a purified gas composition;

reacting the H₂S from the H₂S-containing contaminated aqueous composition with the heavy metal ions in the H₂S-containing contaminated aqueous composition to form a metal sulfide precipitate in a metal-sulfide-containing contaminated aqueous composition;

at least partially introducing the metal-sulfide-containing contaminated aqueous composition to a solid-liquid separator;

removing the metal sulfide precipitate from the metal-sulfide-containing contaminated aqueous composition to form a purified aqueous composition;

wherein the plurality of gas spargers is within the body of the contaminated aqueous composition to distribute the gas composition in the form of bubbles and is adjacent to a lower end of the reactor;

wherein the reactor is in fluid communication with the solid-liquid separator; and wherein the H₂S-containing gas composition is introduced to the reactor at a rate of 4 to 120 milliliters per minute (mL/min) per milligram of the heavy metal ions in the contaminated aqueous composition.

2. The process of claim 1, wherein the heavy metal ions are at least one selected from the group consisting of chromium (Cr) ions, copper (Cu) ions, lead (Pb) ions, arsenic (As) ions, cadmium (Cd) ions, mercury (Hg) ions, aluminum (Al) ions, uranium (U) ions, strontium (Sr) ions, thallium (Tl) ions, zinc (Zn) ions, molybdenum (Mo) ions, tungsten (W) ions, manganese (Mn) ions, vanadium (V) ions, iron (Fe) ions, cobalt (Co) ions, and nickel (Ni) ions.

3. The process of claim 2, wherein the Hg(II) ions are present in the contaminated aqueous composition at a concentration in a range of 0.1 to 1 mg/mL and the contaminated aqueous composition is in contact with the H₂S-containing gas composition at a rate of 92 mL/min in the bubble column reactor, having a saturation time of 10 to 200 minutes, wherein the H₂S-containing gas composition comprises 100 ppmv of H₂S.

4. The process of claim 1, wherein the H₂S-containing gas composition is passed via four or more gas spargers through the contaminated aqueous composition present in the reactor, wherein each of the gas spargers has a colander aqueous structure with an average pore size in the range of about 1 μm to about 10 mm, and the four or more gas spargers are arranged in a helical shape in four quadrants of the reactor with each quadrant containing at least one gas sparger.

5. The process of claim 1, wherein each of the spargers of the plurality of gas spargers have:
a first edge and a second edge;
a ratio of a length of each of the spargers of the plurality of gas spargers to a diameter of the reactor in a range of 1:20 to 1:5;
wherein the length of each of the spargers of the plurality of gas spargers is a vertical distance measured between the first edge and the second edge;
wherein the plurality of gas spargers are arranged with respect to one another in a helical pattern;
a vertical distance between the center of any two adjacent helically arranged gas spargers is in a range of 100% to 400% of the outer diameter of the helical pattern; and
a horizontal distance between the center of any two adjacent helically arranged gas spargers is in a range of 50% to 200% of the length of each of the spargers of the plurality of gas spargers.

6. The process of claim 1, wherein the contaminated aqueous composition comprises at least one liquid selected from the group consisting of tap water, ground water, distilled water, deionized water, saltwater, hard water, fresh water, and wastewater.

7. The process of claim 1, wherein the contaminated aqueous composition comprises at least one anionic species selected from nitrate, nitrite, sulfate, phosphate, fluoride, bromide, hydroxide, and chloride.

8. The process of claim 1, wherein the heavy metal ions are mixed-metal ions in the form of a hydroxide salt selected from the group consisting of zinc-iron-aluminum (ZaFeAl) hydroxide, manganese-iron-aluminum (MnFeAl) hydroxide, cobalt-iron-aluminum (CoFeAl) hydroxide, and copper-iron aluminum hydroxide (CuFeAl), where the hydroxide salt of mixed-metal ions is supported on at least one support selected from the group consisting of a graphene, a graphene oxide, a reduced graphene oxide, an alumina, a carbon nanotube, an activated carbon, a metal organic framework (MOF), a zeolitic imidazolate framework (ZIF), and a covalent organic polymer (COP).

9. The process of claim 1, wherein the reactor is a bubble column reactor in the form of a vertical cylindrical reactor containing at least one propeller agitator disposed therein, wherein the vertical cylindrical reactor has a bottom portion, a vertically oriented cylindrical body portion and a top portion, wherein the bottom portion is cone shaped or pyramidal, wherein a plurality of recirculation tubes fluidly connects the bottom portion of the vertical cylindrical reactor with the body portion of the vertical cylindrical reactor.

10. The process of claim 9, wherein the reactor further comprises at least one reactor selected from the group consisting of a packed bed reactor and a slurry reactor.

11. The process of claim 9, wherein the vertically oriented cylindrical body portion of the reactor is fluidly connected to a solid-liquid separator, wherein the solid-liquid separator is fluidly connected to a mixing tank, wherein the mixing tank is fluidly connected to an electrochemical cell containing an anode and a cathode, wherein the electrochemical cell is fluidly connected to a recovery unit.

12. The process of claim 1, wherein the H₂S-containing gas composition is natural gas.

13. The process of claim 12, wherein the H₂S-containing gas composition further comprises at least one gas selected from the group consisting of nitrogen, argon, methane, ethane, ethylene, propylene, propane, butane, butene, butadiene, and isobutylene.

14. The process of claim 1, wherein the H₂S is present in the H₂S-containing gas composition at s concentration in a range of 10 to 200 parts per million by volume (ppmv) based on a total volume of the H₂S-containing gas composition.

15. The process of claim 1, wherein the heavy metal ions are present in the contaminated aqueous composition at a concentration in a range of 0.05 to 15 milligrams per milliliter (mg/mL).

16. The process of claim 1, wherein during the passing and reacting the contaminated aqueous composition is in contact with the H₂S-containing gas composition at a temperature in a range of from 15 to 40° C. and under a pressure of 0.9 to 1.2 bar.

17. The process of claim 1, further comprising:
electrolyzing the purified aqueous composition to form hydrogen gas by:
at least partially introducing the purified aqueous composition to a mixing tank under continuous agitation;
charging an electrolyte solution to the mixing tank and mixing to form an electrolyte containing aqueous composition;

at least partially introducing the electrolyte containing aqueous composition to an electrochemical cell containing an anode and a cathode;

wherein both electrodes are at least partially immersed in the electrolyte containing aqueous composition;

applying a potential between the anode and cathode to produce hydrogen gas.

18. The process of claim 17, wherein the electrolyte solution comprises iron (II) chloride and sodium chloride.

19. The process of claim 18, wherein a molar ratio of the heavy metal ions to iron (II) ions is in a range of 0.9:1 to 1.1:1.

* * * * *